United States Patent

[11] 3,609,151

[72] Inventors: Florin Seng, Cologne; Kurt Ley, Odenthal; Karl Georg Metzger, Wuppertal-Elberfeld; Dieter Fritsche, Wuppertal-Vohwinkel, all of Germany
[21] Appl. No.: 742,168
[22] Filed: July 3, 1968
[45] Patented: Sept. 28, 1971
[73] Assignee: Farbenfabriken Bayer Aktiengesellschaft, Leverkusen, Germany
[32] Priority: July 26, 1967
[33] Germany
[31] F 53057

[54] 2-AMINO-3-CARBAMIDO-QUINOXALINE-DI-N-OXIDES AND THEIR PRODUCTION
8 Claims, No Drawings

[52] U.S. Cl. .................... 260/250, 424/250
[51] Int. Cl. ........................ C07d 51/78
[50] Field of Search ................ 260/250

[56] References Cited
UNITED STATES PATENTS
3,260,720  7/1966  Berndt .................. 260/250

Primary Examiner—Nicholas S. Rizzo
Attorney—Jacobs & Jacobs

ABSTRACT: 2-Amino-3-carbamido-quinoxaline-di-N-oxides of the formula

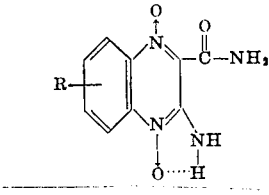

are produced by hydrolising the corresponding 2-amino-3-cyano-quinoxaline-di-N-oxides of the formula

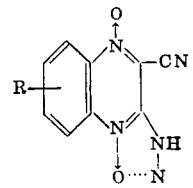

in an acidic solution wherein R is hydrogen, halogen, lower alkyl or lower alkoxy. The compounds are useful in treatment of infections from grampositive and gramnegative bacteria and are administered in the general range of 25 mg./kg. orally or parenterally.

2-AMINO-3-CARBAMIDO-QUINOXALINE-DI-N-OXIDES AND THEIR PRODUCTION

The present invention is concerned with 2-amino-3-carbamido-di-N-oxides which have been found to exhibit exceptional bactericidal activity. More particularly the compounds of the present invention are 2-amino-3-carbamido-quinoxaline-di-N-oxides which may be present in tautomeric N-hydroxy imino form and which may be represented by the following formulae:

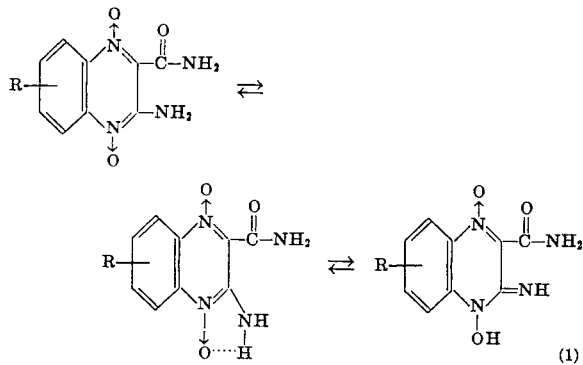

(1)

wherein R is hydrogen, halogen, lower alkyl or lower alkoxy. Preferred values for R include methyl, methoxy, chlorine, bromine and flourine.

Since the compounds of the present invention have shown hydrogen bridges and may be present in the above represented tautomeric N-hydroxy imino form for convenience the middle formula above set forth will be used for illustrative convenience.

The invention also relates to a process for the preparation of a compound of formulae (1) in which the corresponding new 2-amino-3-cyano-quinoxaline-di-N-oxide of the formula:

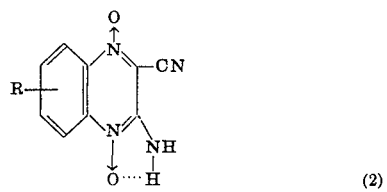

(2)

is hydrolyzed in acidic solution.

Taking 2-amino-3-carbonamido-quinoxaline-di-N-oxide as an example, the reaction is illustrated by the following equation:

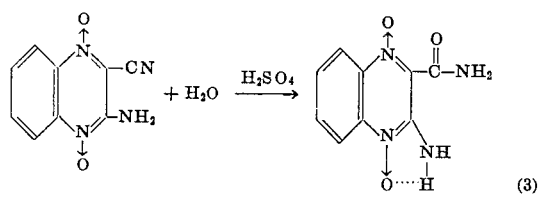

(3)

The hydrolysis is expediently carried out by dissolving the 2-amino-3-cyano-quinoxaline-di-N-oxides in sulfuric acid at a concentration of 80–100 percent, preferably approximately 96 percent, the remainder being water, and subsequently stirring at hydrolysis temperature. This temperature is generally 25°–80 C, preferably 50°–70° C. After neutralization, preferably with an aqueous ammonia solution or with the aqueous solution of an oxide, hydroxide, carbonate or bicarbonate of an alkali metal or alkaline earth metal, particularly sodium, potassium or magnesium, the 2-amino-3-cyano-quinoxaline-di-N-oxides are obtained as crystalline compounds.

The new 2-amino-3-cyano-quinoxaline-di-N-oxides required as starting materials are obtainable, according to our own previous proposal, by reacting benzofuroxans with malonic acid dinitrile in the presence of a catalytic amount of an amine.

The process of the invention is illustrated by the following nonlimitative examples.

Example 1

Preparation of 2-amino-3-carbonamido-quinoxaline-di-N-oxide (I; R=H).

250 g. (1.25 mole) of 2-amino-3-cyano-quinoxaline-di-N-oxide are dissolved in a mixture of 1,000 ml. of 96 percent sulfuric acid and 40 g. of water and stirred at 60° C. for 5 hours. The solution is subsequently poured on to 1.5 kg. of ice and neutralized with 2,650 ml. of 33 percent ammonia. 250 g. (92.6 percent of theory), of 2-amino-3carbonamido-quinoxaline-di-N-oxide are obtained in the form of red crystals which decompose, after recrystallization from dimethyl formamide, at 242°–243° C.

The 2-amino-3-cyano-quinoxaline-di-N-oxide used as starting compound is obtained as follows: 13.6 g. (0.1 mole) of benzofuroxan are suspended in 150 ml. of ethanol and mixed with 6.6 g. (0.1 mole) of malonic acid dinitrile. 8.5 g. (0.1 mole) of piperidine are slowly added dropwise. The suspended benzofuroxan dissolves and the temperature of the reaction mixture rises to 30°–70° C., depending on the speed of the dropwise addition. After 3 hours, the mixture is cooled to about +5° C. and after filtering off with suction, 13 g. (64.3 percent of theory) of 2-amino-3-cyano-quinoxaline-di-N-oxide are obtained in the form of red crystals; m.p. 221°–113° C. (from dimethyl formamide). When the process is carried out in dimethyl formamide, the yield rises to 86 percent of theory.

Example 2

The compounds II–IV listed in the Table were prepared according to the process of example 1 using 7-methyl, 7-chloro- or 7-methoxy-2-amino- 3-cyano-quinoxaline-di-N-oxide respectively as the starting material, which is obtained as being obvious for example 1:

| Compound Number | | Color | Temperature of decomposition, °C. | Yield, percent |
|---|---|---|---|---|
| II | (structure with CH₃ substituent) | Yellow-red.. | 226–228 | 91.7 |

| Compound Number | | Color | Temperature of decomposition, °C. | Yield, percent |
|---|---|---|---|---|
| III | [structure: quinoxaline di-N-oxide with Cl substituent, -C(=O)-NH$_2$ and -NH group] | Dark-red | 246 | 93.4 |
| IV | [structure: quinoxaline di-N-oxide with CH$_3$O substituent, -C(=O)-NH$_2$ and -NH group] | ...do...... | 246-247 | 92.4 |

The bactericidal activity of the compounds according to the present invention has been proven both in vitro tests exhibiting good antibacterial effect and in vivo tests on animals. The compounds of the present invention may be administered orally or parenterally. The most advantageous dosage range has been found to be from about 25 mg. to about 500 mg. and more particularly dosage ranges from about 25 mg./kg. to about 150 mg./kg. per day have exhibited beneficial and effective results.

It is, however, to be appreciated that in administering compounds of the present invention as is the case with a therapeutic substance a variety of factors must be taken into consideration in determining the dosage to be administered in the given case. These factors include the body weight of the patient receiving the compound, the severity of the condition to be treated, the postmedical history and the current state of health. Depending upon these and other factors it is possible that dosage ranges lower than or higher than the above indicated ranges could be utilized effectively. In the case where fairly large amounts are to be administered it is generally recognized to be advisable to distribute the total daily dose by administering several individual doses during the course of a day.

The compounds of the present case can be administered either as such or in combination with pharmaceutically acceptable, nontoxic carriers.

Suitable forms of administration in combination with various inert carriers are tablets, capsules, powders, sprays, aqueous suspensions, injectable solutions (which may be contained in ampuls), elixirs, syrups and the like. Such carriers include solid extenders or fillers, a sterile aqueous medium as well as various nontoxic organic solvents and the like. Obviously, the tablets and the like intended for oral administration can be provided with saccharine or similar additives. The therapeutically active compound should be present in the aforesaid case in a concentration of about 0.5 to 90 percent by weight of the total mixture, that is in amounts which suffice to achieve the dosage mentioned above.

In case of oral application, the tablets may of course also contain additives such as sodium citrate, calcium carbonate and dicalcium phosphate, together with various admixture such as starch, preferably potato starch and the like, and binders, such as polyvinyl-pyrrolidone, gelatin and the like. Furthermore, lubricants such as magnesium stearate, sodium sulfate and talc can be added for producing tablets. In the case of aqueous suspensions and/or elixirs intended for oral administration, the active compound can be used with various taste improvers, dyestuffs, emulsifiers and/or dispersing agents, together with diluents, such as water, ethanol, propylene glycol, glycerine and similar compounds or combinations.

In the case of parenteral administration, there may be used solutions or suspensions of the active compounds in sesame oil or peanut oil or in aqueous propylene glycol or N,N-dimethyl formamide. When required, such solutions or suspensions should first be rendered isotonic by the addition of the necessary amount of salt or glucose. Solutions or suspensions of this type are mainly suitable for intramuscular and intraperitoneal injections.

The actual formulation of such forms of administration are per se known.

The effectiveness of the compounds of the present invention is more clearly appreciated by the following experiments or compounds representative of those embraced by formula 1.

In animal tests on white mice, the animals were infected intraperitoneally and treated subcutaneously or orally as follows:

1. Single doses of 25, 50, 200 and 500 mg./kg. prior to infection.

2. Two doses of 15 and 20 mg./kg., respectively, 2 hours before and 3 hours after the infection.

These dosages were well tolerated.

Depending on the compound the acute toxicity range for rats and mice is between 150 and about 1,000 mg./kg. in the case of a single oral administration. The use of the new compounds against mycoplasma infections is also envisaged. 1. Animal tests on white mice:

| Compound Number | Bacteria used for infection | Percent surviving animals 24 hours after infection |
|---|---|---|
| I (R=H) | E. coli | 100 |
| | Staph. aureus | 100 |
| | Strept. pyogenes | 100 |
| II (R=CH$_3$) | Staph. aureus | 50 |
| III (R=Cl) | Staph. aureus | 60 |
| | Strept. pyogenes | 50 |

2. Inhibition values in vitro:

| Bacterium | Minimum inhibition concentrations in µg./ml. nutrient of compound | | |
|---|---|---|---|
| | I (R=H) | II (R=CH$_3$) | III (R=Cl) |
| E. coli | 50 | 50 | 100 |
| Proteus sp | 50 | 100 | 100 |
| Klebsiella sp | 50 | 150 | 100 |
| Staph. aureus | 50 | 100 | 100 |
| Strept. pyogenes | 150 | 100 | 100 |

The 2-smino-3carbonamide-di-N-oxides show furthermore (same general dosage range as disclosed) activity against amoeba and flagellata (E. histolytica, Trichomonas vaginalis, Lamblia muris) both in invitro tests and in vivo tests on animals (mice, rats, golden-hamsters). compounds I, II and III are respectively those of the general formula 1, wherein R is hydrogen (I), methyl (II) or chlorine (III).

When the compounds of the present invention are utilized in the form of pharmaceutical compositions these must be dispensed in unit dosage form. The individual preparations can therefore be made up each containing a unit dose, 2, 3 or 4 unit doses, a half, a third or a fourth of a unit dose or the like as desired.

We claim:
1. 2-Amino-3-carbonamido-di-N-oxides of the formula:

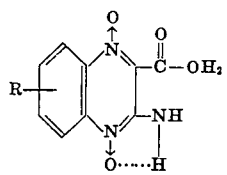

in which R is hydrogen, halogen, lower alkyl or lower alkoxy.

2. A compound according to claim 1 in which R is hydrogen, methyl, methoxy or chlorine.

3. The compound according to claim 1, wherein R is methyl of the formula

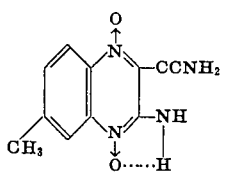

4. The compound according to claim 1, wherein R is chloro of the formula

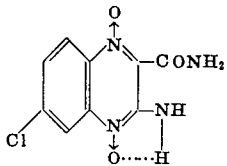

5. The compound according to claim 1, wherein R is methoxy of the formula

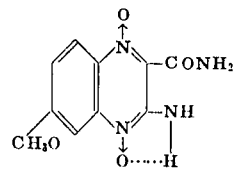

6. The compound according to claim 1, wherein R is hydrogen of the formula

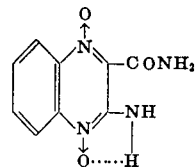

7. 2-Amino-3-carbamido-quinoxaline-di-N-oxide of the formula

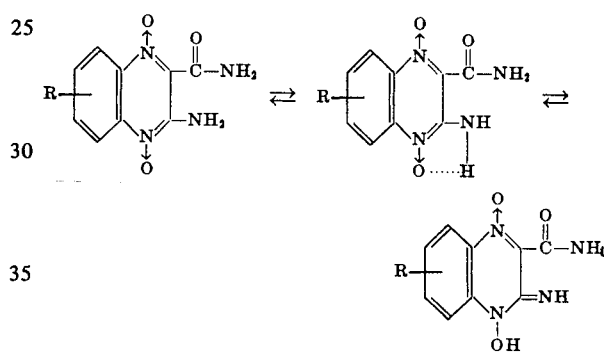

wherein R is hydrogen, halogen, lower alkyl or lower alkoxy.

8. 2-Amino-3-cyano-di-N-oxide of the formula

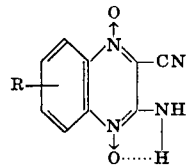

in which R is hydrogen, halogen, lower alkyl or lower alkoxy.

UNITED STATES PATENT OFFICE
CERTIFICATE OF CORRECTION

Patent No. 3,609,151      Dated September 28, 1971

Inventor(s) Florin Seng, Kurt Ley, Karl Georg Metzger and Dieter Fritsche

It is certified that error appears in the above-identified patent and that said Letters Patent are hereby corrected as shown below:

In claim 1, the structural formula reading:

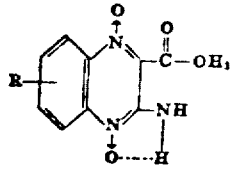  should read: 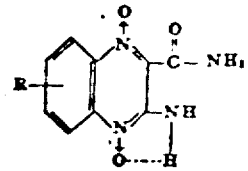

In claim 3, the structural formula reading:

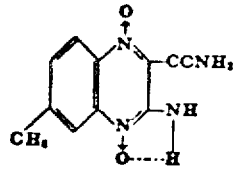  should read: 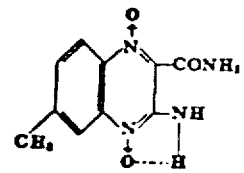

In claim 7, the structural formula appearing at line 35, reading:

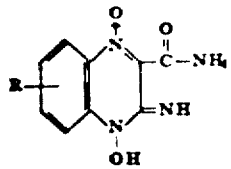  should read: 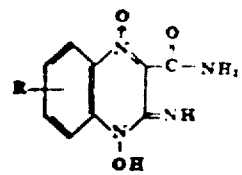

Signed and sealed this 4th day of April 1972.

(SEAL)
Attest:

EDWARD M. FLETCHER, JR.
Attesting Officer

ROBERT GOTTSCHALK
Commissioner of Patents